(12) United States Patent
Kobayashi

(10) Patent No.: US 7,140,736 B2
(45) Date of Patent: *Nov. 28, 2006

(54) IMAGE PROCESSING SYSTEM, PROJECTOR, PROGRAM, INFORMATION STORAGE MEDIUM AND IMAGE PROCESSING METHOD

(75) Inventor: Masanobu Kobayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/178,377

(22) Filed: Jul. 12, 2005

(65) Prior Publication Data

US 2005/0243286 A1 Nov. 3, 2005

Related U.S. Application Data

(63) Continuation of application No. 10/796,191, filed on Mar. 10, 2001, now Pat. No. 6,939,011.

(30) Foreign Application Priority Data

Mar. 25, 2003 (JP) ............................. 2003-082273
Dec. 1, 2003 (JP) ............................. 2003-401300

(51) Int. Cl.
G03B 21/14 (2006.01)

(52) U.S. Cl. ...................................................... 353/69

(58) Field of Classification Search ................ 353/69, 353/70, 101, 122; 348/806, 807; 345/207
See application file for complete search history.

(56) References Cited

U.S. PATENT DOCUMENTS

| 5,200,815 | A | 4/1993 | Tsujihara et al. |
| 5,298,985 | A | 3/1994 | Tsujihara et al. |
| 5,519,447 | A | 5/1996 | Shima et al. |
| 5,532,765 | A | 7/1996 | Inoue et al. |
| 6,002,454 | A | 12/1999 | Kajiwara et al. |
| 6,184,903 | B1 * | 2/2001 | Omori .......................... 345/505 |
| 6,246,421 | B1 * | 6/2001 | Omori .......................... 345/505 |
| 6,367,933 | B1 | 4/2002 | Chen et al. |
| 6,741,295 | B1 | 5/2004 | Nieuwenhuizen et al. |
| 6,932,479 | B1 | 8/2005 | Kobayashi et al. |
| 2004/0070694 | A1 | 4/2004 | Haruna et al. |
| 2004/0196303 | A1 * | 10/2004 | Matsuda ....................... 345/690 |
| 2004/0227908 | A1 * | 11/2004 | Wada et al. ................... 353/94 |
| 2005/0024538 | A1 * | 2/2005 | Park et al. .................... 348/602 |
| 2005/0094108 | A1 * | 5/2005 | Kobayashi .................... 353/69 |

(Continued)

FOREIGN PATENT DOCUMENTS

EP 0 616 473 A2 9/1994

(Continued)

Primary Examiner—William C. Dowling
(74) Attorney, Agent, or Firm—Oliff & Berridge, PLC

(57) ABSTRACT

To provide an image processing system and the like which can more exactly correct the distortion in an image by reducing the influence of color in an area onto which the image is projected, a projector is provided with a correction section which corrects image signals to adjust a distortion of an image; an image projection section which projects an image based on the image signals; a sensing section which senses the projected image to generate sensing information; a luminance-distribution analyzing section which generates coordinate information indicating a peak position which is the brightest position in the sensed projected image, based on the total luminance value for each pixel line forming the sensed projected image based on the sensing information; and a correction-amount deriving section which determines the distortion in the projected image and derives the amount of correction for the correcting section, based on the coordinate information.

11 Claims, 11 Drawing Sheets

U.S. PATENT DOCUMENTS

2005/0105057 A1* 5/2005 Matsuda et al. .............. 353/70

FOREIGN PATENT DOCUMENTS

| JP | B2 2720824 | 11/1997 |
| JP | A 2000-241874 | 9/2000 |
| JP | A 2001-061121 | 3/2001 |
| JP | A-2001-211461 | 8/2001 |
| JP | A 2004-134908 | 4/2004 |
| JP | A 2004-222153 | 8/2004 |
| KR | 2001-62211 | 7/2001 |
| WO | WO 01/47259 A1 | 6/2001 |

* cited by examiner

FIG. 10

| H | V | A' | | B' | | C' | | D' | |
|---|---|---|---|---|---|---|---|---|---|
| | | x | y | x | y | x | y | x | y |
| 0.50 | 0.50 | 0 | 0 | 0 | 767 | 1023 | 767 | 1023 | 0 |
| 0.55 | 0.50 | 16 | 12 | 16 | 755 | 1023 | 767 | 1023 | 0 |
| 0.60 | 0.50 | 32 | 24 | 32 | 743 | 1023 | 767 | 1023 | 0 |
| 0.65 | 0.50 | 48 | 36 | 48 | 731 | 1023 | 767 | 1023 | 0 |
| ⋮ | ⋮ | ⋮ | ⋮ | ⋮ | ⋮ | ⋮ | ⋮ | ⋮ | ⋮ |

# IMAGE PROCESSING SYSTEM, PROJECTOR, PROGRAM, INFORMATION STORAGE MEDIUM AND IMAGE PROCESSING METHOD

This is a Continuation of application Ser. No. 10/796,191 filed Mar. 10, 2004 now U.S. Pat. No. 6,939,011. The entire disclosure of the prior application is hereby incorporated by reference herein in its entirety.

Japanese Patent Application No. 2003-82273, filed on Mar. 25, 2003 and Japanese Patent Application No. 2003-401300, filed on Dec. 1, 2003, are hereby incorporated by reference in their entirety.

BACKGROUND OF THE INVENTION

The present invention relates to an image processing system, projector, program, information storage medium and image processing method which can correct the distortion of an image.

An image projected from an image display device such as a projector or the like may be distorted to create a so-called keystone distortion in the vertical or horizontal direction, depending on the relationship between the image display device and a position onto which the image is projected therefrom.

Therefore, the image display device must display an image after any distortion therein has been corrected.

In general, a projector with a function of correcting the keystone distortion semi-automatically corrects the image distortion when a user indicates each of four corners in a screen using a mouse or the like.

However, it is difficult and troublesome for the user to exactly indicate the four screen corners using the mouse.

To solve such a problem, for example, Japanese Patent Laid-Open No. 2000-241874 has proposed a projector which can correct a keystone distortion in an image by detecting points on a screen, based on sensing information from a camera located in the front of the projector.

However, such a technique of correcting the keystone distortion based on the screen as disclosed in the Japanese Patent Laid-Open No. 2000-241874 can only correct the distortion in an image projected within the range of the screen, but cannot correct the image distortion if an image is projected onto a region other than the screen, such as wall.

BRIEF SUMMARY OF THE INVENTION

The present invention is made in view of the above-mentioned problem and may provide an image processing system, projector, program, information storage medium and image processing method which can reduce the influence of color on a region onto which an image is projected so that the distortion in the projected image can more exactly be determined.

An image processing system and projector according to aspects of the present invention include:

correction means for correcting image signals to adjust a distortion of an image;

image projection means for projecting an image based on the image signals;

sensing means for sensing the projected image to generate sensing information;

brightness-index-value-distribution analyzing means for partitioning the sensed projected image by predetermined image processing units based on the sensing information, detecting a portion of the sensed projected image that includes a image processing unit having a maximum brightness index value among all of the image processing units as a peak position or detecting part of a portion of the sensed projected image in which the image processing units adjacent to one another have the same brightness index values, and generating coordinate information which indicates the peak position; and correction-amount derivation means for determining the distortion in the projected image based on the coordinate information, and deriving an amount of correction for the correction means according to a state of the distortion in the projected image, wherein the correction means corrects the image signals based on the amount of correction.

An image processing system and projector according to other aspects of the present invention include:

a correction section which corrects image signals to adjust a distortion of an image;

an image projection section which projects an image based on the image signals;

a sensing section which senses the projected image to generate sensing information;

a brightness-index-value-distribution analyzing section which partitions the sensed projected image by predetermined image processing units based on the sensing information, detects a portion of the sensed projected image that includes a image processing unit having a maximum brightness index value among all of the image processing units as a peak position or detects part of a portion of the sensed projected image in which the image processing units adjacent to one another have the same brightness index values, and generates coordinate information which indicates the peak position; and a correction-amount derivation section which determines the distortion in the projected image based on the coordinate information, and derives an amount of correction for the correction section according to a state of the distortion in the projected image, wherein the correction section corrects the image signals based on the amount of correction.

A program according to a further aspect of the present invention is a computer-readable program for causing a computer to function as:

correction means for correcting image signals to adjust a distortion of an image;

image projection means for projecting an image based on the image signals;

sensing means for sensing the projected image to generate sensing information;

brightness-index-value-distribution analyzing means for partitioning the sensed projected image by predetermined image processing units based on the sensing information, detecting a portion of the sensed projected image that includes a image processing unit having a maximum brightness index value among all of the image processing units as a peak position or detecting part of a portion of the sensed projected image in which the image processing units adjacent to one another have the same brightness index values, and generating coordinate information which indicates the peak position; and correction-amount derivation means for determining the distortion in the projected image based on the coordinate information and for deriving an amount of correction for the correction means according to a state of the distortion in the projected image, wherein the correction means corrects the image signals based on the amount of correction.

An information storage medium according to a still further aspect of the present invention stores a computer-readable program, the program causing a computer to function as:

correction means for correcting image signals to adjust a distortion of an image;

image projection means for projecting an image based on the image signals;

sensing means for sensing the projected image to generate sensing information;

brightness-index-value-distribution analyzing means for partitioning the sensed projected image by predetermined image processing units based on the sensing information, detecting a portion of the sensed projected image that includes a image processing unit having a maximum brightness index value among all of the image processing units as a peak position or detecting part of a portion of the sensed projected image in which the image processing units adjacent to one another have the same brightness index values, and generating coordinate information which indicates the peak position; and correction-amount derivation means for determining the distortion in the projected image based on the coordinate information and for deriving an amount of correction for the correction means according to a state of the distortion in the projected image, wherein the correction means corrects the image signals based on the amount of correction.

An image processing method according to a yet further aspect of the present invention includes:

projecting a monochrome image onto a predetermined area;

sensing the projected image to generate sensing information;

partitioning the sensed projected image by predetermined image processing units based on the sensing information, and detecting a portion of the sensed projected image that includes a image processing unit having a maximum brightness index value among all of the image processing units as a peak position or detecting part of a portion of the sensed projected image in which the image processing units adjacent to one another have the same brightness index values;

generating coordinate information which indicates the peak position;

determining a distortion in the projected image based on the coordinate information, and deriving an amount of correction for correcting image signals so that the distortion in the projected image is eliminated according to a state of the distortion in the projected image; and correcting the image signals based on the amount of correction.

In accordance with the present invention, the image processing system and the like can determine the image distortion based on a distribution of brightness in the projected image rather than a hue in the projected image. Therefore, they can reduce the influence of color in a region onto which the image is projected and thus more exactly determine the distortion in the projected image.

In particular, the image processing system and the like can detect a portion of the sensed projected image in which an image processing unit having the maximum brightness index value among all of the image processing units, as a peak position. Therefore, the processing speed can be increased since it is only required that the portion having the maximum brightness index value is detected.

Alternatively, the image processing system and the like can determine a portion of the sensed projected image in which the image processing units adjacent to one another have the same brightness index values, as a peak position. Thus, the distortion in the projected image can be determined more precisely since a difference of relative brightness can be determined.

The brightness index value used herein may include a luminance value (including a computationally deformed luminance value), an illuminance value, a lightness value and so on. The image processing unit used herein may include a pixel, a pixel block, one vertical or horizontal line of pixels defining an image and the like.

With the above image processing system, projector, program and information storage medium, the image processing units may include vertical pixels and horizontal pixels, the vertical pixels being pixels arranged in a vertical direction in the sensed projected image and the horizontal pixels being pixels arranged in a horizontal direction in the sensed projected image, and the brightness-index-value-distribution analyzing means may compute an accumulated brightness index value for each of groups of the vertical pixels and may compare the accumulated brightness index value in each of the groups of the vertical pixels adjacent to one another in the horizontal direction, may determine a horizontal coordinate position of the peak position based on a pixel position of a portion of the sensed projected image in which the groups of the vertical pixels adjacent one another in the horizontal direction have the same accumulated brightness index value, may compute an accumulated brightness index value for each of groups of the horizontal pixels and may compare the accumulated brightness index value in each of the groups of the horizontal pixels adjacent to one another in the vertical direction, and may determine a vertical coordinate position of the peak position based on a pixel position of a portion of the sensed projected image in which the groups of the horizontal pixels adjacent one another in the vertical direction have the same accumulated brightness index value.

With the above image processing method, the image processing units may include vertical pixels and horizontal pixels, the vertical pixels being pixels arranged in a vertical direction in the sensed projected image and the horizontal pixels being pixels arranged in a horizontal direction in the sensed projected image, and the method may further include:

computing an accumulated brightness index value for each of groups of the vertical pixels, and comparing the accumulated brightness index value in each of the groups of the vertical pixels adjacent to one another in the horizontal direction;

determining a horizontal coordinate position of the peak position based on a pixel position of a portion of the sensed projected image in which the groups of the vertical pixels adjacent one another in the horizontal direction have the same accumulated brightness index value;

computing an accumulated brightness index value for each of groups of the horizontal pixels, and comparing the accumulated brightness index value in each of the groups of the horizontal pixels adjacent to one another in the vertical direction; and determining a vertical coordinate position of the peak position based on a pixel position of a portion of the sensed projected image in which the groups of the horizontal pixels adjacent one another in the vertical direction have the same accumulated brightness index value.

Thus, the image processing system and the like can determine a difference of brightness between the groups of pixels rather than one pixel and noise can be eliminated and the change in the brightness can be determined more exactly. Therefore, image distortion can be determined more precisely.

With the above image processing system, projector, program and information storage medium, the brightness index value may be a luminance value, and the brightness-index-value-distribution analyzing means may determine the horizontal coordinate position of the peak position based on a pixel position at which a rate of change in a total luminance value in each of the groups of the vertical pixels adjacent to one another in the horizontal direction is equal to one, and may determine the vertical coordinate position of the peak position based on a pixel position at which a rate of change in a total luminance value in each of the groups of the horizontal pixels adjacent to one another in the vertical direction is equal to one.

With the above image processing method, the brightness index value may be a luminance value, and the method may further include:

determining the horizontal coordinate position of the peak position based on a pixel position at which a rate of change in a total luminance value in each of the groups of the vertical pixels adjacent to one another in the horizontal direction is equal to one; and determining the vertical coordinate position of the peak position based on a pixel position at which a rate of change in a total luminance value in each of the groups of the horizontal pixels adjacent to one another in the vertical direction is equal to one.

Thus, the image processing system and the like can more exactly determine the image distortion since they can detect a position in the projected image in which the rate of change in the total luminance value for adjacent pixel groups becomes equal to one, that is, the brightest position of the projected image near the center portion of the projected image.

With the above image processing system, projector, program and information storage medium, the image projection means may project a black-colored image and a white-colored image, the sensing means may generate the sensing information for the black-colored image and the sensing information for the white-colored image, and the brightness-index-value-distribution analyzing means may generate the sensing information from which influence of ambient light is eliminated based on a difference between the sensing information of the black-colored image and the sensing information of the white-colored image, and may detect the peak position based on the generated sensing information.

The above image processing method may further includes:

generating sensing information from which influence of ambient light is eliminated; and detecting the peak position based on the generated sensing information.

Thus, the image processing system and the like can avoid any false detection and exactly determine the peak position by processing the image based on the sensing information under a state in which the influence of ambient light is removed.

The ambient light used herein may include an illuminating light, sunlight and so on.

BRIEF DESCRIPTION OF THE SEVERAL VIEWS OF THE DRAWING

FIG. 10 is a schematic view illustrating a structure of data for correcting the image distortion according to one example of this embodiment.

DETAILED DESCRIPTION OF THE EMBODIMENT

Figure 1:
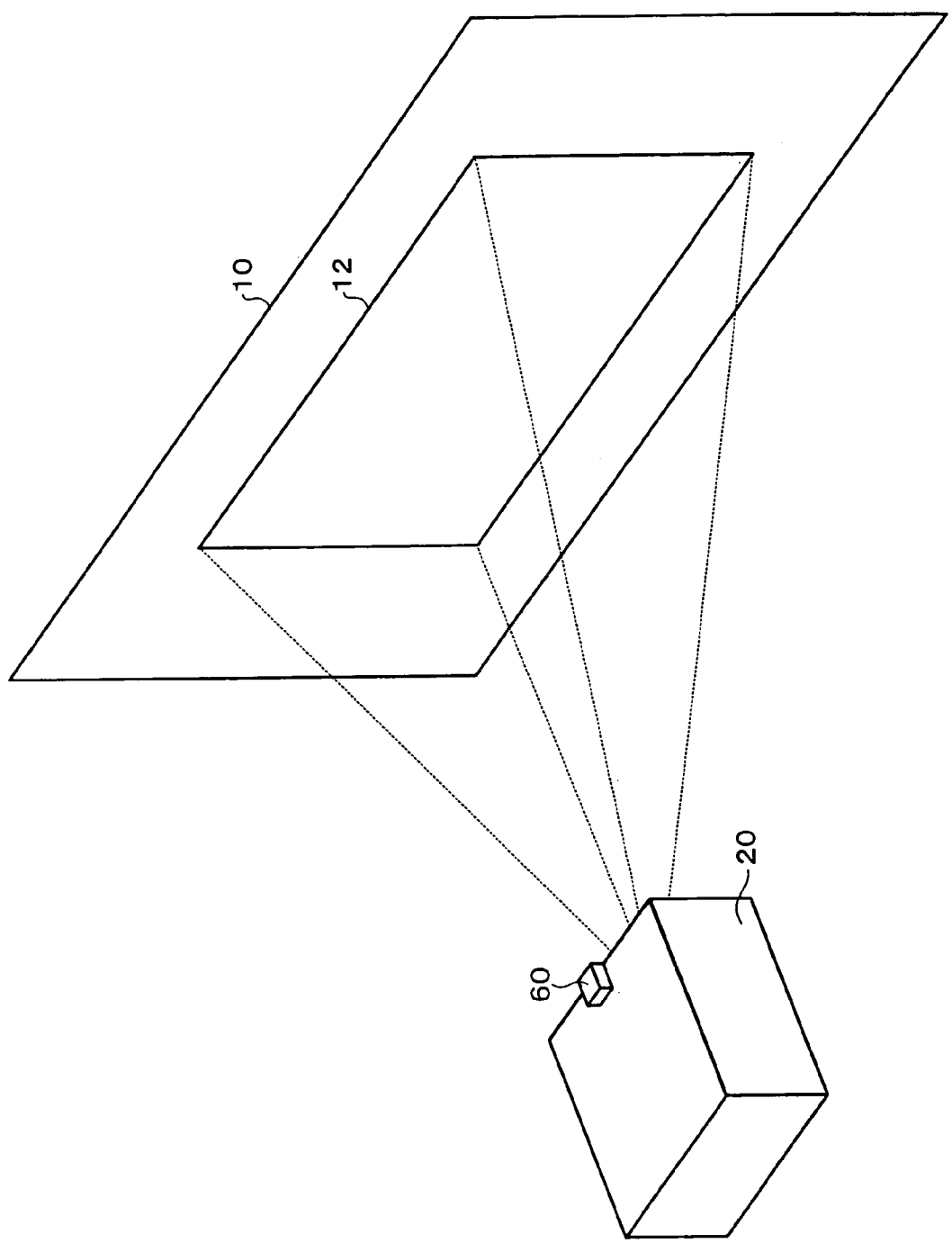
FIG. 1 schematically shows a state when an image is projected.

The present invention will now be described in connection with a projector to which the present invention is applied with reference to the drawing. However, an embodiment shown in the following is not intended to limit the subject matter of the invention as described in the accompanying claims. All the components shown in such an embodiment is not necessarily essential as means defined by the accompanying claims.

Overall System

FIG. 1 schematically shows a state when an image is projected.

A projector 20 projects a rectangular image onto a screen 10 to form a rectangular projected image 12. In this embodiment, a sensor 60, which is part of a sensing means, senses a region of the screen 10 which includes the projected image 12.

Even if the same image is projected from the projector 20, the sensor 60 will sense different sensing information depending on type of the screen 10. For example, if the screen 10 has a reddy color, the white color on the screen 10 will be reddy while if the screen 10 has a bluish color, the white color on the screen 10 will be bluish.

For such a reason, it is difficult that the conventional image processing systems for detecting the distortion in the projected image 12 only based on the difference of color between sensing information exactly detects the distortion in the projected image 12.

Furthermore, the conventional image processing systems for detecting the distortion in the projected image 12 by sensing the images of the four corners on the screen 10 cannot detect the distortion in the projected image 12 if it is difficult to detect the four corners of the region onto which the image is projected (e.g., if the image is projected onto a wall).

This embodiment adopts a technique of using the luminance value as the brightness index value and detecting the distortion in the projected image 12 based on a difference of brightness in the projected image 12.

Functional Blocks

The functional blocks of the projector 20 for realizing such a feature will be described blow.

Figure 2:
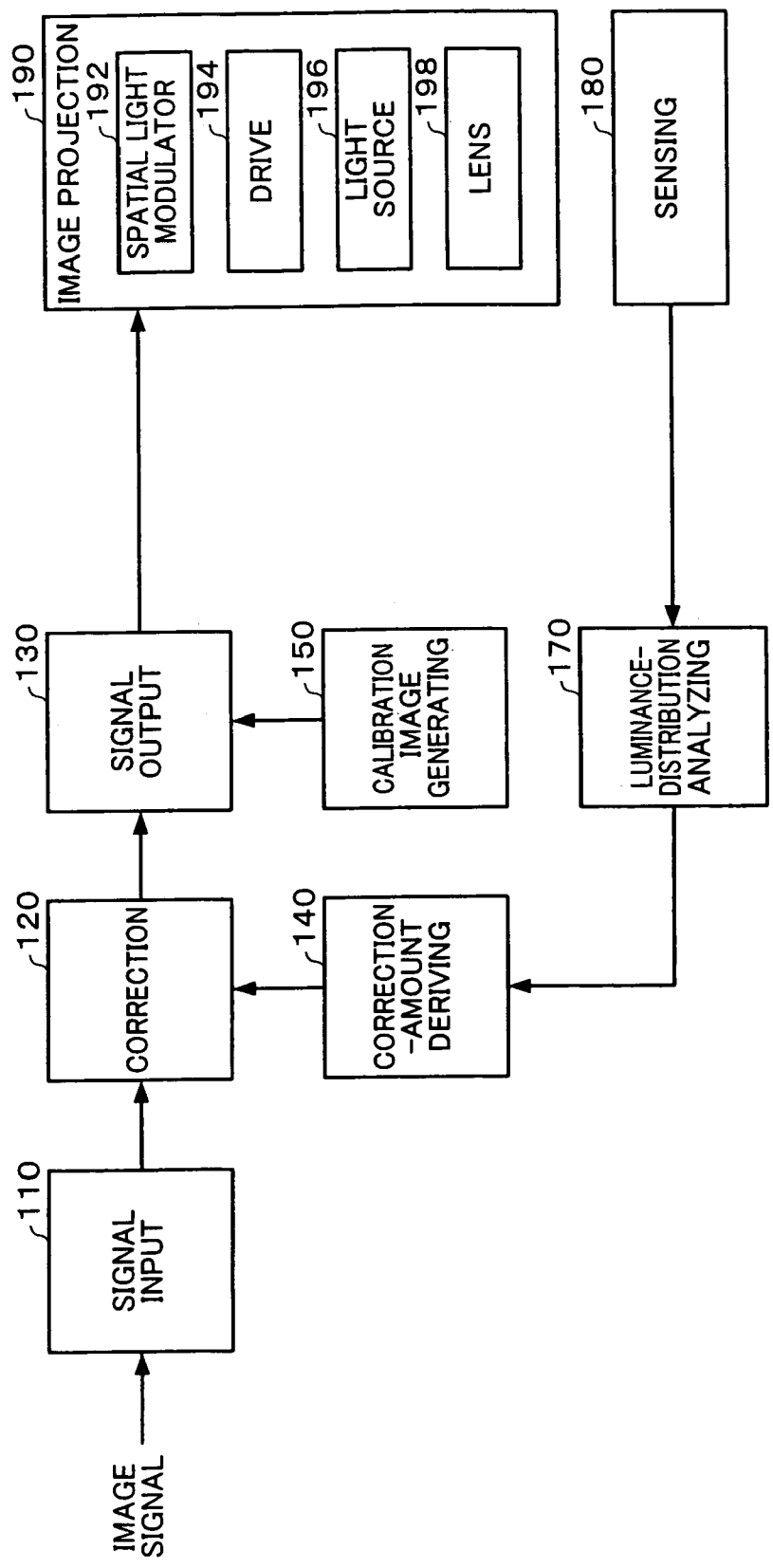
FIG. 2 is a functional block diagram of a projector according to one example of an embodiment of the present invention.

FIG. 2 is a functional block diagram of a projector according to one example of this embodiment.

The projector 20 comprises a signal input section 110 for inputting image signals, a correction section 120 for correcting the inputted image signals so that the image distortion is regulated, a signal output section 130 for outputting the corrected image signals, an image projection section 190 for projecting an image based on the image signals, a sensing section 180 for sensing a region on the screen 10 including the projected image 12, a luminance-distribution analyzing section 170 for analyzing the distribution of luminance in the projected image 12 based on the sensing information and for generating the coordinate information for the brightest position in the projected image 12, and a correction-amount deriving section 140 for deriving the amount of image signal correction to be obtained by the correction section 120, based on the coordinate information.

The image projection section 190 comprises a spatial light modulator 192, a drive section 194 for driving the spatial light modulator 192, a light source 196 and a lens 198 having a focus adjustment function.

The drive section 194 drives the spatial light modulator 192 based on the image signals from the signal output section 130. The image projecting section 190 projects the light from the light source 196 through the spatial light modulator 192 and lens 198.

The projector 20 also comprises a calibration image generating section 150 for generating image signals used to display calibration images.

Hardware for causing a computer to implement the respective parts of the aforementioned projector 20 may be accomplished by the following components.

Figure 3:
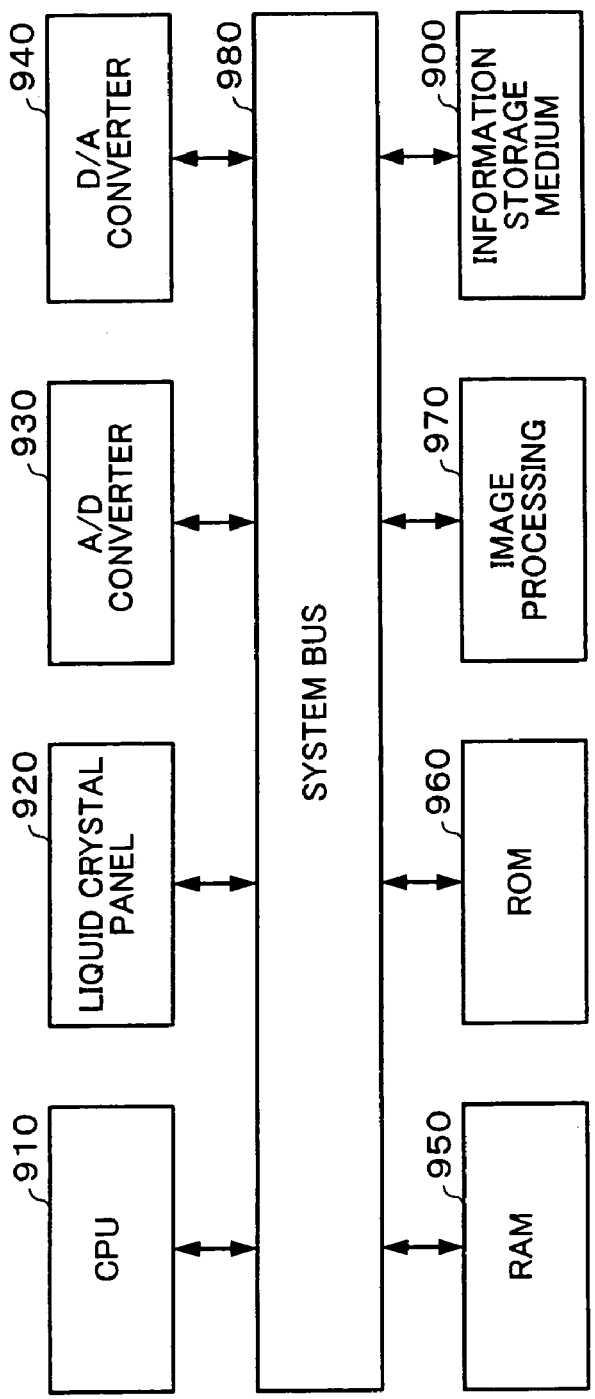
FIG. 3 is a hardware block diagram of a projector according to one example of this embodiment.

FIG. 3 is a hardware block diagram illustrating a projector according to one example of this embodiment.

For example, the computer may implement an A/D converter 930 or the like as the signal input section 110; an image processing circuit 970, RAM 950, CPU 910 or the like as the conversion section 120; a D/A converter 940 or the like as the signal output section 130; the image processing circuit 970, RAM 950 or the like as the calibration image generating section 150 and luminance-distribution analyzing section 170; a CCD camera as the sensing section 180; and a liquid crystal panel 920, a ROM 960 for driving the liquid crystal light valve driver for driving the liquid crystal panel 920 or the like as the spatial light modulator 192.

These sections are configured to mutually deliver the information therebetween through a system bus 980. The sensor 60 is part of the sensing section 180.

These sections may partially or wholly be incorporated into a computer as hardware or circuits or as software or drivers.

Furthermore, the functions of the luminance-distribution analyzing section 120 and the like may be implemented in the computer by reading a program out of an information storage medium 900, which program is designed to cause the computer to function as the luminance-distribution analyzing section 160 and the like.

Such an information storage medium 900 may be accomplished, for example, by CD-ROM, DVD-ROM, ROM, RAM, HDD or the like through either of the contact or non-contact type reading mode.

The aforementioned functions may be implemented into the computer by downloading a program for incorporating the above functions into the computer or the like from a host device or the like through transmission channel, in place of the information storage medium 900.

Image Processing

The flow of image processing using these sections will be described below.

Figure 4:
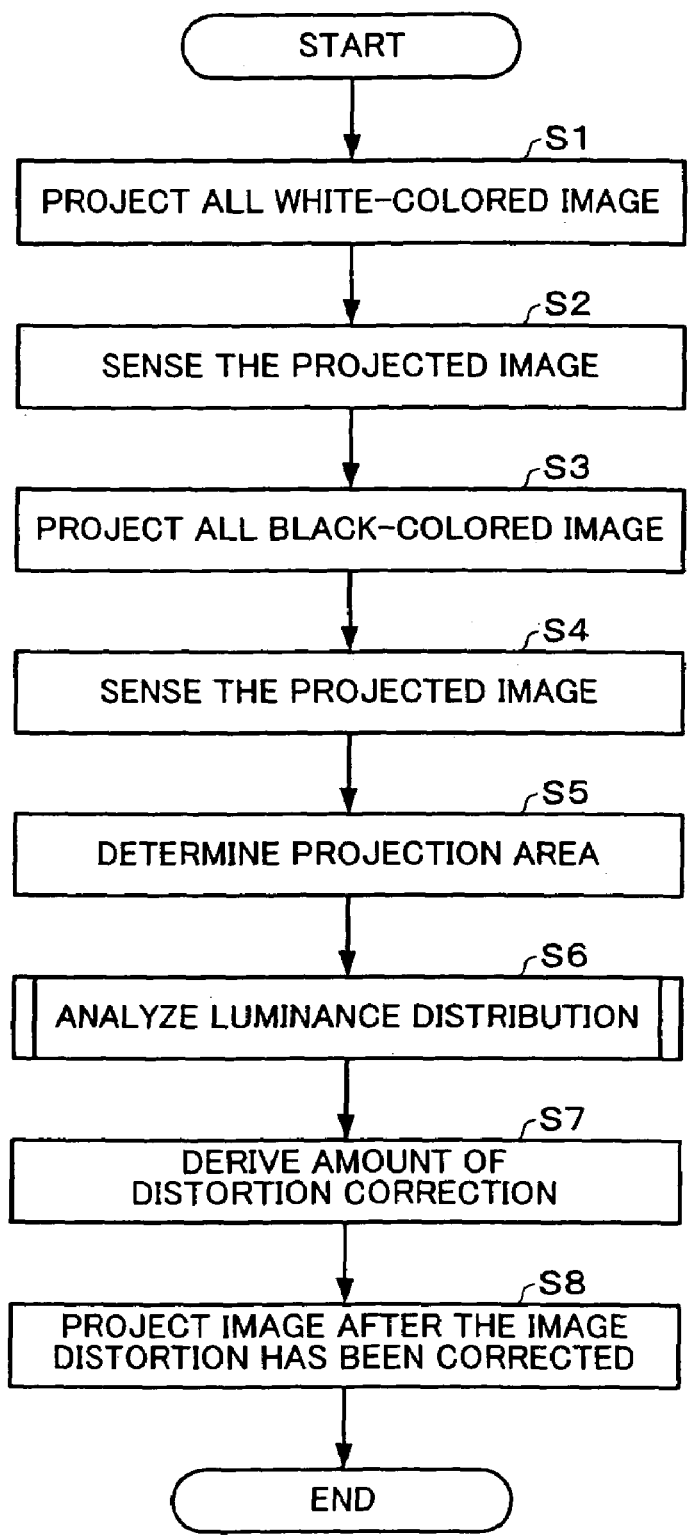
FIG. 4 is a flow chart illustrating a procedure of correcting an image distortion according to one example of this embodiment.

FIG. 4 is a flow chart illustrating a procedure of correcting an image distortion according to one example of this embodiment.

First of all, a user activates the projector 20 which in turn projects calibration images.

The calibration image generating section 150 generates a all white-colored calibration image which is in turn projected by the image projection section 190 (step S1).

The sensing section 180 then senses the screen 10 onto which the all white-colored calibration image is projected (step S2).

The calibration image generating section 150 also generates a all black-colored calibration image which is in turn projected by the image projection section 190 (step S3).

The sensing section 180 then senses the screen 10 onto which the all black-colored calibration image is projected (step S4).

And, the luminance-distribution analyzing section 170 determines the region of the projected image 12 in the sensed region based on the sensing information from the sensing section 180 (step S5). More particularly, the luminance-distribution analyzing section 170 distinguishes the projection area corresponding to the projected image 12 from the other areas, based on a difference between the sensing information of the all white-colored calibration image and all black-colored calibration image. The influence of the ambient light such as the illuminating light or the like can be eliminated by subtracting an image signal value represented by the sensing information of the all black-colored calibration image from an image signal value expressed by the sensing information of the all white-colored calibration image.

The luminance-distribution analyzing section 170 then performs a luminance-distribution analysis (step S6).

The luminance-distribution analysis (step S6) will be described more concretely.

Figure 5:
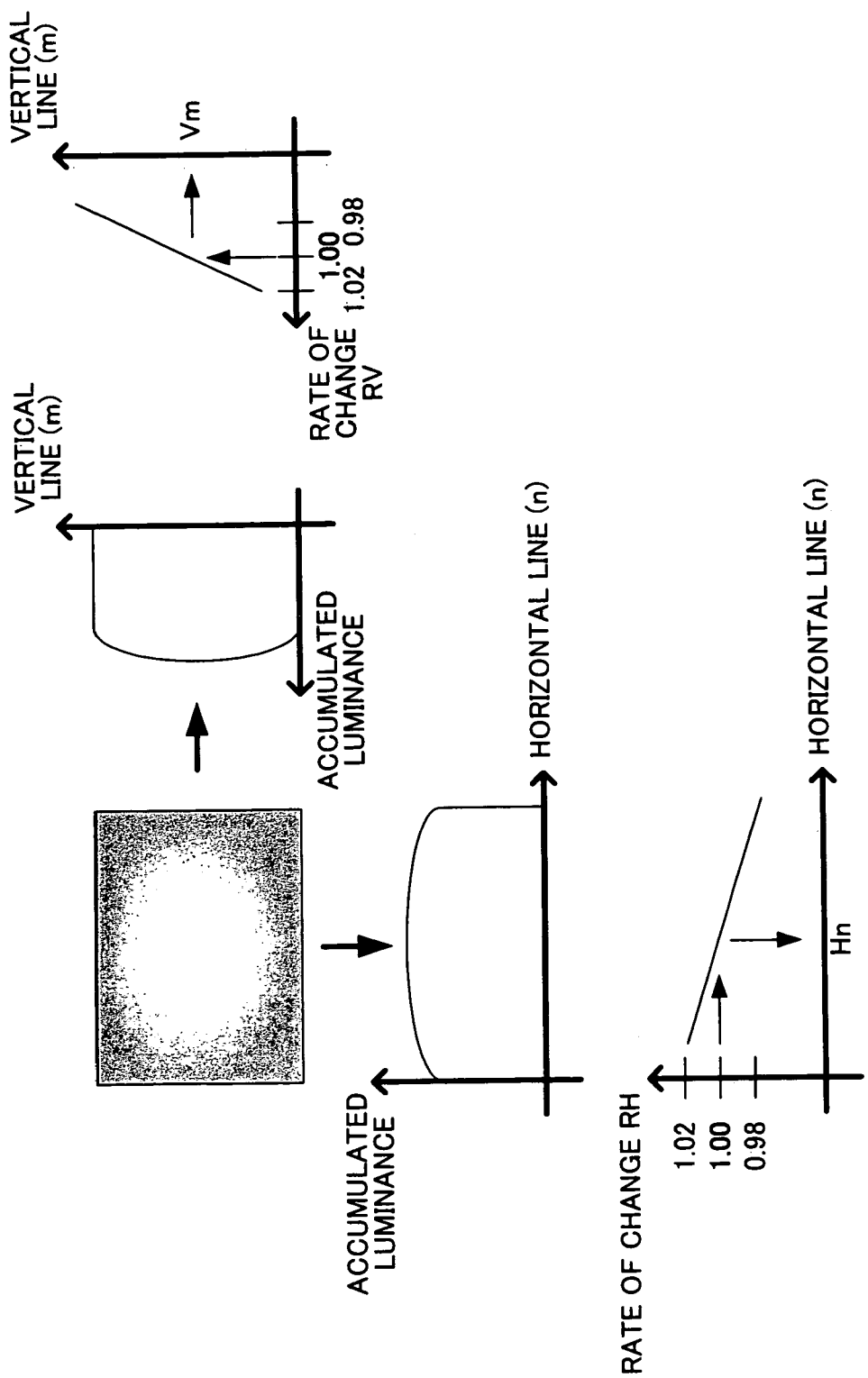
FIG. 5 is a schematic view illustrating a distribution of image luminance according to one example of this embodiment.
Figure 6:
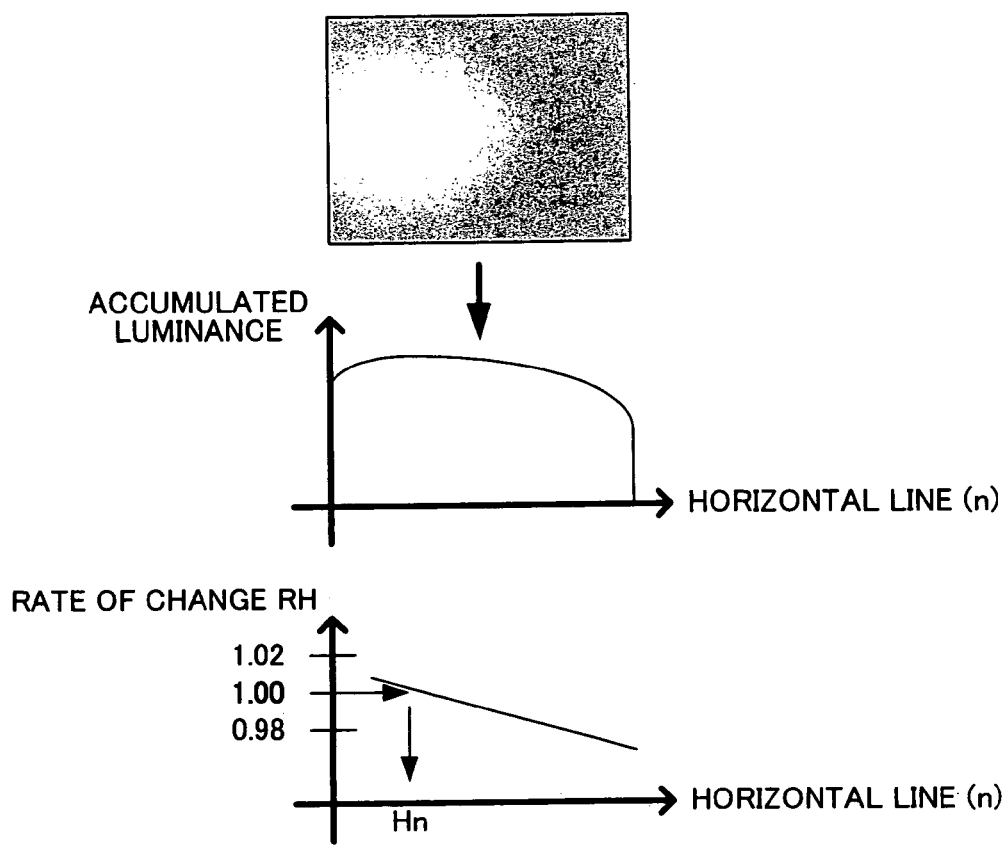
FIG. 6 is a schematic view illustrating a distribution of image luminance according to another example of this embodiment.
Figure 7:
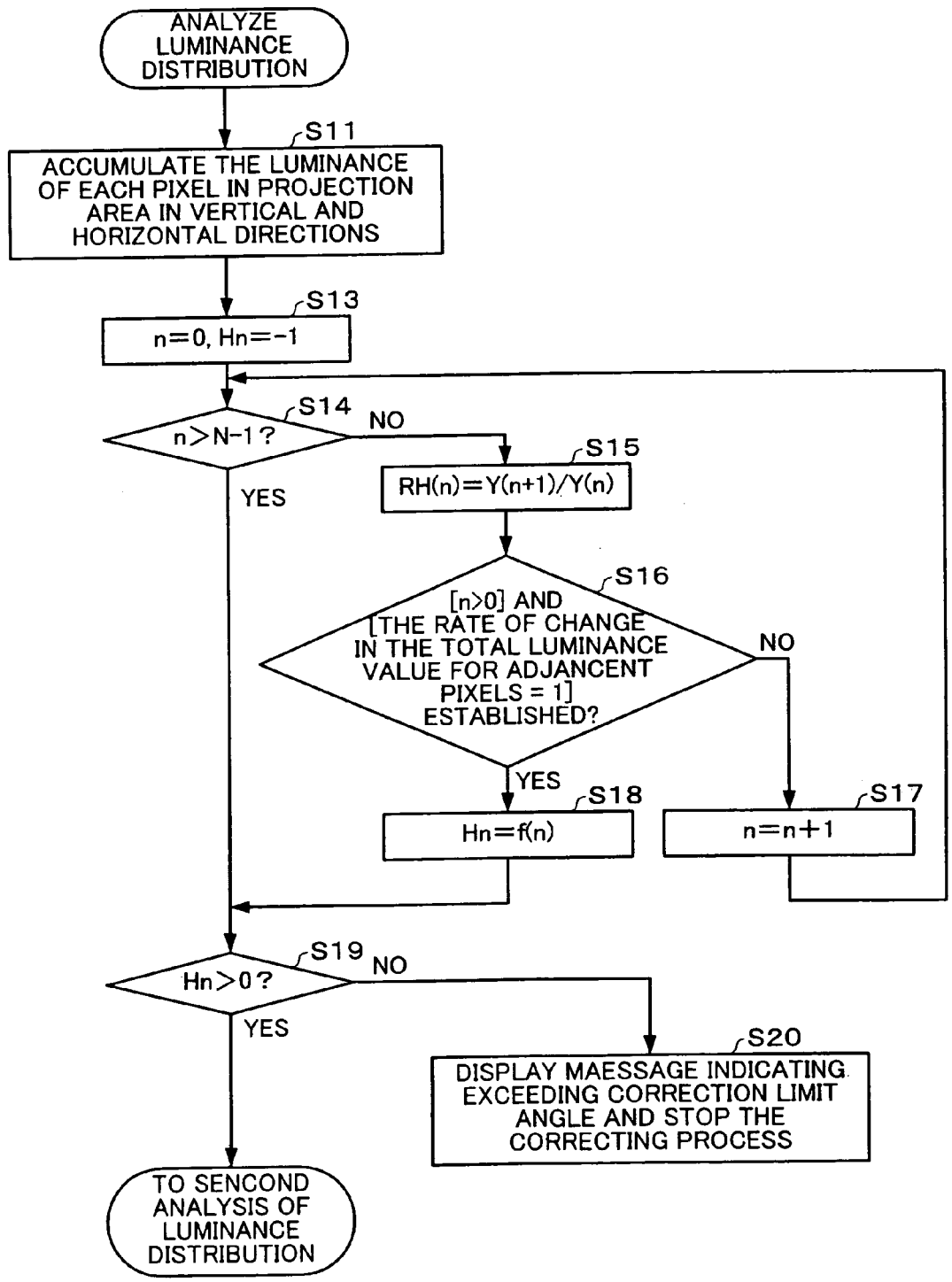
FIG. 7 is a flow chart illustrating a procedure of analyzing a distribution of luminance according to one example of this embodiment.
Figure 8:
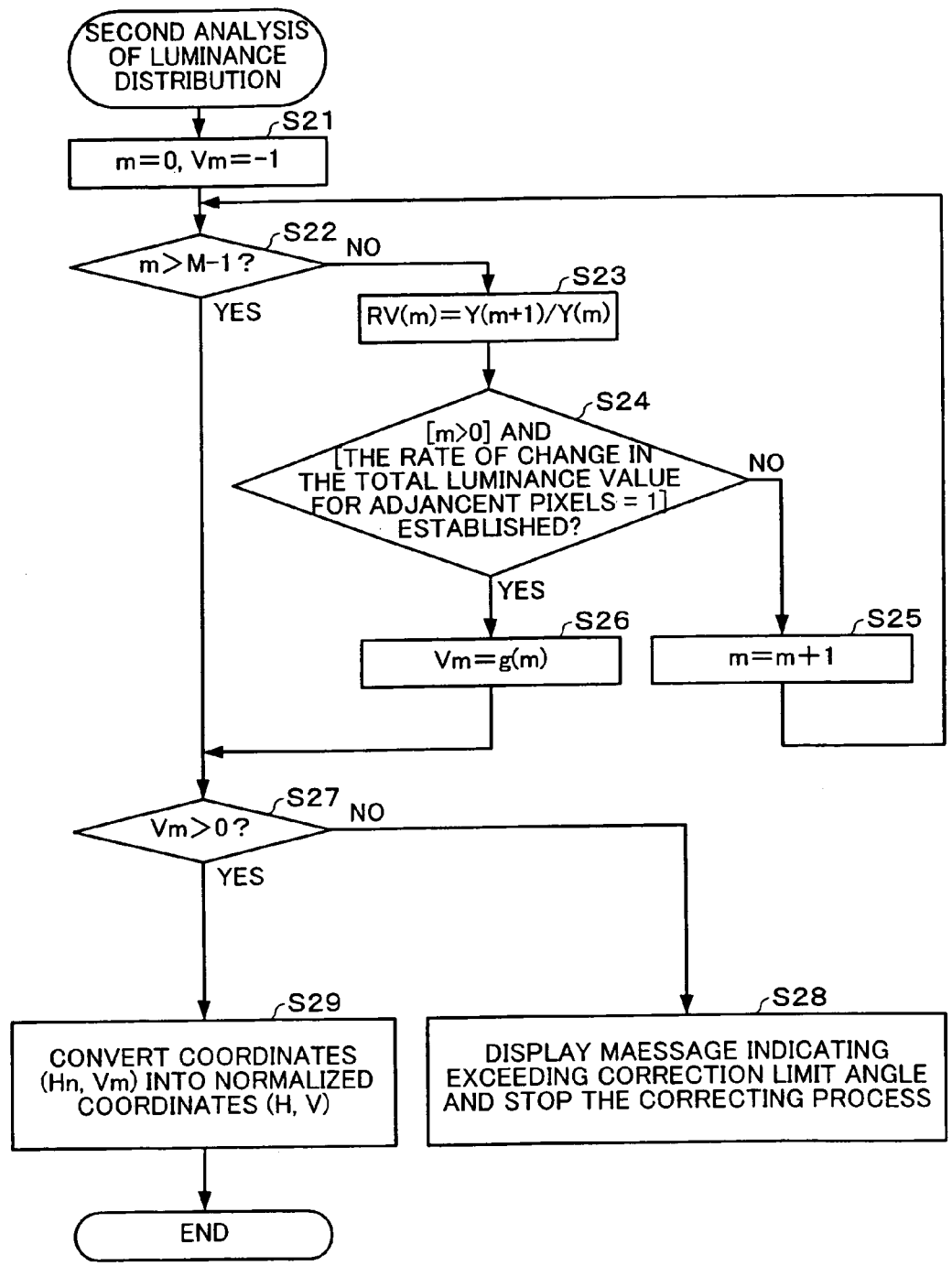
FIG. 8 is a flow chart illustrating a continued procedure of analyzing a distribution of luminance according to the example of this embodiment.

FIG. 5 is a schematic view illustrating a distribution of image luminance according to one example of this embodiment. FIG. 6 is a schematic view illustrating a distribution of image luminance according to another example of this embodiment. FIG. 7 is a flow chart illustrating a procedure of analyzing a distribution of luminance according to one example of this embodiment. FIG. 8 is a flow chart illustrating a continued procedure of analyzing a distribution of luminance according to one example of this embodiment.

The luminance distribution in an image shown in FIG. 5 has the highest luminance value at the center of the image while the luminance distribution of an image shown in FIG.

6 has the highest luminance value at the leftward portion of the image. In such a manner, the luminance distribution in the projected image 12 varies depending on the positional relationship between the direction of projection from the projector 20 and the screen 10. When the projector 20 is directly opponent against the screen 10, the central portion of the image is brightest, resulting in provision of the highest luminance value (i.e., the maximum brightness index value) at the central portion of the image, as shown in FIG. 5.

The luminance-distribution analyzing section 170 first accumulates the luminance values of the vertically and horizontally arranged pixels in the projection area (i.e., the projected image 12 sensed by the sensor 60) in the sensing information (step S11). It is assumed herein that the projection area in the sensing information includes vertical pixels of M in number and horizontal pixels of N in number. This number of pixels corresponds to the number of pixels or pixel blocks in the sensor 60.

As shown in FIG. 5, for example, the luminance-distribution analyzing section 170 can generate data indicative of the relationship between the horizontal lines (n) and the accumulated luminance by accumulating (or adding) the luminance values of the pixels of the projection area in the sensing information in the vertical direction. Similarly, the luminance-distribution analyzing section 170 can generate data indicative of the relationship between the vertical lines (m) and the accumulated luminance by accumulating the luminance values of the pixels of the projection area in the sensing information in the horizontal direction. It is assumed herein that n is an integer between zero and N−2 and that m is an integer between zero and M−2.

The luminance-distribution analyzing section 170 then computes the rate of change RH(n) in luminance value on the horizontal line, based on a value Y(n+1)/Y(n) indicative of the change of luminance value for each pixel. Similarly, the luminance-distribution analyzing section 170 computes the rate of change RH(n) in luminance value on the vertical line, based on a value Y(m+1)/Y(m) indicative of the change of luminance value for each pixel. Herein, Y(a) is the accumulated luminance value for a pixel a.

The luminance-distribution analyzing section 170 then determines and generates a pixel having the rate of luminance value change RH(n) equal to one on the horizontal line and another pixel having the rate of luminance value change RV(m) equal to one on the vertical line as coordinate information indicate of the coordinates (H,V) of the peak or brightest positions.

The projector 20 displays a message indicative of exceeding the limit angle that can correct the image distortion if the rate of change in either of the horizontal or vertical line overruns one for all the pixels or underruns one for all the pixels.

A concrete technique of determining the coordinates will now be described.

The luminance-distribution analyzing section 170 first sets the pixel number n on the horizontal line at zero and the coordinate position Hn on the horizontal line at −1 (step S13).

The luminance-distribution analyzing section 170 then judges whether or not a condition of n>N−1 can be established or whether or not the judgment for all the pixels on the horizontal line has completed (step S14).

If the condition of n>N−1 is not established, the luminance-distribution analyzing section 170 computes RH(n) =Y(n+1)/Y(n) (step S15) and judges whether or not n>0 and the rate of change of the total luminance value in the adjacent groups of pixels=1 can be established (step S16).

In such a case, a formula for judging that the rate of change for the total luminance value in the adjacent groups of pixels is equal to 1 may be one that [H(n−1)>1] and [RH(n)<1]. In other words, points stepping over the point wherein the rate of change for the total luminance value in the adjacent groups of pixels is equal to one may be detected.

If [n>0] and [the rate of change for the total luminance value in the adjacent groups of pixels=1] are not established, the luminance-distribution analyzing section 170 increases n by one to judge the next pixel number (step S17) and repeatedly executes the steps S14 to S17.

If [n>0] and [the rate of change for the total luminance value in the adjacent groups of pixels=1] are established, the luminance-distribution analyzing section 170 substitutes f(n) which shows the coordinate position linearly interpolated to Hn (step S18).

At this time, f(n) may be f(n)={1−RH(n−1)}/{RH(n)−RH(n−1)}+(n−1).

When the judgment for all the pixels on the horizontal line has completed, or when [the rate of change for the total luminance value in the adjacent groups of pixels=1] is established, the luminance-distribution analyzing section 170 judges whether or not [Hn>0 (Hn is larger than zero)] is established (step S19). If [Hn>0] is not established, this means that the coordinates of the brightest position for all the pixels on the horizontal line could not be detected. Therefore, the projector 20 displays a message of exceeding the correction limit angle and also stops the correcting process (step S20).

The luminance-distribution analyzing section 170 then performs the similar process for the vertical line as for the horizontal line. The process for the vertical line will be described with reference to FIG. 8.

First of all, the luminance-distribution analyzing section 170 sets the pixel number m on the vertical line at zero, and also sets a coordinate position Vm on the vertical line at −1 (step S21).

The luminance-distribution analyzing section 170 then judges whether or not a condition of m>M−1 can be established or whether or not the judgment for all the pixels on the vertical line has completed (step S22).

If the condition of m>M−1 is not established, the luminance-distribution analyzing section 170 computes [RV(m) =Y(m+1)/Y(m) (step S23)] and then judges whether or not [m>0] and [the rate of change for the total luminance value in the adjacent groups of pixels=1] are established (step S24).

A formula for judging that the rate of change for the total luminance value in the adjacent groups of pixels is equal to 1 maybe one that [RV(m−1)>1] and [RV(m)<1]. In other words, points stepping over the point wherein the rate of change for the total luminance value in the adjacent groups of pixels is equal to one may be detected.

If [m>0] and [the rate of change for the total luminance value in the adjacent groups of pixels=1] are not established, the luminance-distribution analyzing section 170 increases m by one to judge the next pixel number (step S17) and repeatedly performs the steps S22 to S25.

If [m>0] and [the rate of change for the total luminance value in the adjacent groups of pixels=1] are established, the luminance-distribution analyzing section 170 substitutes g(m) which shows a coordinate position linearly interpolated to Vm (step S26).

Herein, g(m) may be g(m)={1−RV(m−1)}/{RV(m)−RV(m−1)}+(m−1).

If the judgment for all the pixels on the vertical line has completed, or if [the rate of change for the total luminance value in the adjacent groups of pixels=1] is established, the luminance-distribution analyzing section 170 judges whether or not [Vm>0 (Vm is larger than zero)] is established (step S27). If [Vm>0] is not established, this means that the coordinates of the brightest position for all the pixels on the vertical line could not be detected. Therefore, the projector 20 displays a message of exceeding the correction limit angle and also stops the correcting process (step S28).

If the correction limit angle is not exceeded in both the horizontal and vertical lines, the luminance-distribution analyzing section 170 outputs a coordinate information indicative of coordinates (H, V) provided by normalizing the coordinates (Hn, Vm) toward the correction-amount deriving section 140 (step S29). The normalization may be made, for example, by computing [H=(Hn+0.5)/N] and [V=(Vm+0.5)/M]. The addition of 0.5 is for such a purpose of surely sensing the peak and not necessarily required for the normalization.

If the brightest location is at the center of the projected image 12 as shown in FIG. 5, the coordinates (H, V) are also located centrally. If the brightest position is nearer the left side of the projected image 12 as shown in FIG. 6, the coordinates (H, V) are also located leftward.

As shown in FIG. 4, the correction-amount deriving section 140 derives the amount of correction for the image distortion based on this coordinate information (step S7).

Figure 9:
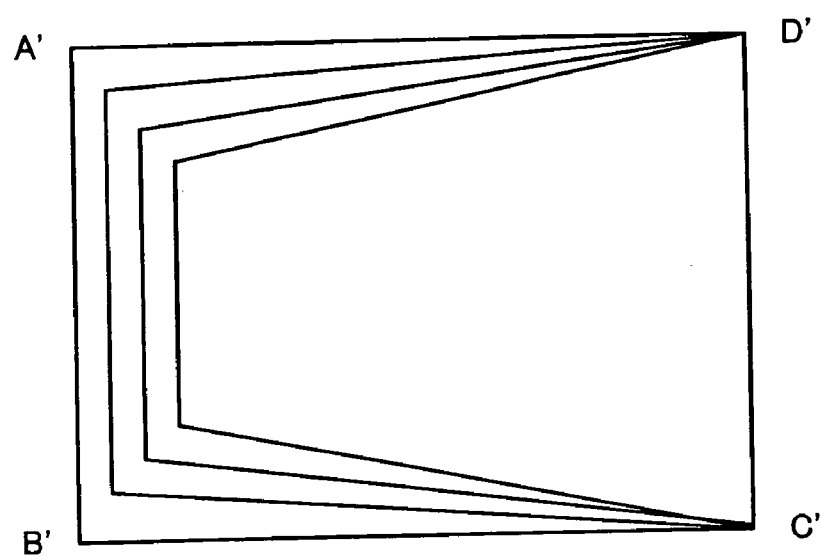
FIG. 9 is a schematic view illustrating an image after the distortion in this image has been corrected according to one example of this embodiment.

FIG. 9 is a schematic view illustrating an image after the distortion in this image has been corrected according to one example of this embodiment. FIG. 10 is a schematic view illustrating a structure of data used for correcting the image distortion according to one example of this embodiment.

The correction-amount deriving section 140 derives amounts of correction for the coordinates (A'x, A'y), (B'x, B'y), (C'x, C'y) and (D'x, D'y) at the four corners A', B', C' and D' of a rectangular region in the spatial light modulator 192 corresponding to the projected image 12, based on image distortion correcting data shown in FIG. 10 wherein the coordinates (A'x, A'y), (B'x, B'y), (C'x, C'y) and (D'x, D'y) are associated with the coordinates (H, V).

For example, if the projected image 12 consists of 1024 horizontal pixels and 768 vertical pixels and also if (H,V)=(0.50, 0.50), that is, if the center of projected image 12 is brightest, the coordinates (A'x, A'y) of the corner A', the coordinates (B'x, B'y) of the corner B', the coordinates (C'x, C'y) of the corner C' and the coordinates (D'x, D'y) of the corner D' will be (0, 0), (0, 767), (1023, 767) and (1023, 0), respectively.

If (H,V)=(0.65, 0.50), that is, if the projected image 12 is distorted in the horizontal direction, the coordinates (A'x, A'y) of the corner A', the coordinates (B'x, B'y) of the corner B', the coordinates (C'x, C'y) of the corner C' and the coordinates (D'x, D'y) of the corner D' will be (48, 36), (48, 731), (1023, 767) and (1023, 0), respectively.

In such a manner, if the projected image 12 is distorted, the coordinates of the corners A' to D' vary. Thus, the correction-amount deriving section 140 can derive the amounts of correction depending on the degree of variation.

The correction section 120 updates the correction data based on the amounts of correction derived by the correction-amount deriving section 140 and then uses the updated correction data to correct the image signals.

The signal output section 130 then outputs the image signals corrected by the correction-amount deriving section 140 toward the image projection section 190. The image projection section 190 projects an image corrected with respect to its distortion, based on the corrected image signals (step S8).

As described, the projector 20 of this embodiment can more exactly detect the image distortion since the projector 20 will less be influenced by the ambient light, the color in the projection area and the like when the distribution of luminance is analyzed based on the rate of change in the relative brightness for each of the pixels forming the projected image 12, which rate of change is provided from the sensing information of the projected image 12.

According to this embodiment, furthermore, the projector 20 can more exactly detect the image distortion with reduction of noise influence since the relative change of brightness in the pixels forming the projection image 12 can be sensed by detecting part of the luminance value non-differentiated in the adjacent image processing units as peak positions when the projected image 12 is sectioned by predetermined image processing units (by the horizontal and vertical lines).

In particular, this embodiment can exactly detect the image distortion using the rate of change in the brightness index value (or luminance value) for each pixel, although, for example, if the screen 10 has its left half of blue color and its right half of red color, it is difficult that the conventional technique of determining the image distortion based on the color of the projected image 12 detects the image distortion.

Figure 11:
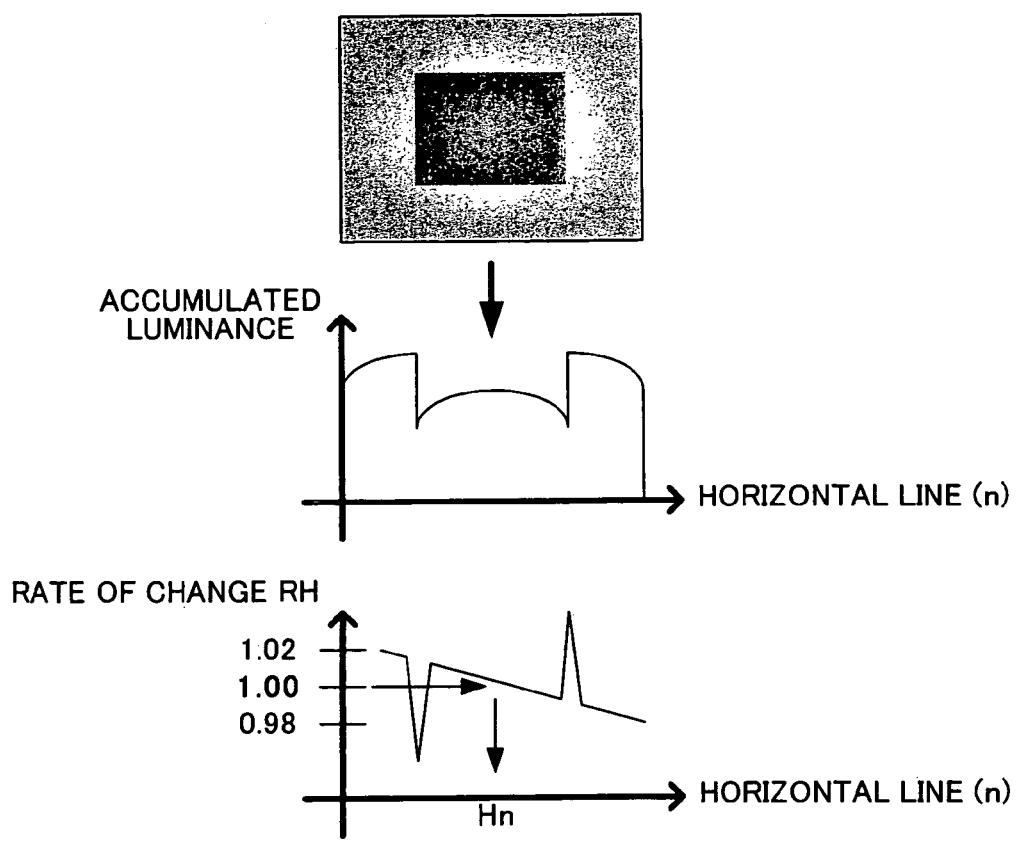
FIG. 11 is a schematic view illustrating a luminance distribution of image according to another example of this embodiment.

FIG. 11 is a schematic view illustrating a distribution of image luminance according to another example of this embodiment.

Even if a material having its low gain is applied on the screen at the center thereof as shown in FIG. 11, for example, the projector 20 can detect the image distortion by sensing a point wherein the rate of change in the brightness index value is equal to one. If there are a plurality of pixels having the rate of change equal to one as shown in FIG. 11, for example, a pixel in which the rate of change in the brightness index value is more stable than the adjacent pixels may be set as one coordinate value.

According to this embodiment, furthermore, the projector 20 can more exactly detect the image distortion while preventing faulty detection by sensing the change of brightness based on the sensing information from which the influence of ambient light has been eliminated.

The optical axis of the lens 198 in the image projection section 190 may coincide with the optical axis of the sensor 60 since the projector 20 will not directly determine the shape of the projected image 12. Thus, the sensor 60 can easily be integrated with the projector 20. In other words, the sensor 60 may be built in the projector 20.

Furthermore, the sensor 60 may be any low-resolution sensor since it is required that it may only detect the differential brightness index value in the projected image 12. Thus, the manufacturing cost of the sensor 60 can be reduced.

The sensor 60, which functions as part of the sensing section 180, can more inexpensively be produced since it will not directly detect the position and may be lower in resolution.

Modifications

Although the preferred embodiment of the present invention has been described, the present invention is not limited to the aforementioned forms.

The example shown in FIG. 1 may include the sensor 60 mounted on the top of the projector 20. However, the sensor 60 may be mounted in the projector 20 or located at a position spaced apart from the projector 20. In these cases, the projector 20 can correct the image distortion through the aforementioned process if the data shown in FIG. 10 are modified depending on the positional relationship between the sensor 60 and the projector 20.

In the embodiment, the projector 20 uses the rate of change in luminance value. However, the projector 20 may use a differential luminance value. Moreover, the projector 20 may use the luminance value itself in the case of a monochromatic image and may use the luminance value nearer 0.3 R+0.6 G+0.1 B in the case of a color image expressed by R, G and B signals. In addition, the projector 20 may use any one of various brightness index value other than the luminance value, such as illuminance value, lightness value and so on.

Although the aforementioned embodiment uses the respective one of the vertical and horizontal lines on which the pixels forming the image are located, as an image processing unit used when the peak position is to be detected, the projector 20 may use a pixel or a pixel block (e.g., 4*4 pixels) as one image processing unit.

Although the embodiment has been described as to the luminance-distribution analyzing section 170 which detects part of the portion that there is no difference between the luminance values in the adjacent image processing units, as a peak position, the luminance-distribution analyzing section 170 may be configured to detect the portion having the maximum luminance value in all the image processing units as a peak position.

The peak position (H, V) can be detected, for example, by dividing one horizontal line into N pixel blocks and using H=n/N to determine a peak luminance position H from the position n of a pixel block having the maximum luminance value in the horizontal direction, and also by dividing one vertical line into M pixel blocks and using V=m/M to determine a peak luminance position V from the position m of a pixel block having the maximum luminance value in the vertical direction, In such a case, the processing speed can be accelerated since only the maximum luminance value may be detected.

Although the embodiment has been described as to the projector 20 adopting all the groups of pixels on the horizontal and vertical lines as image processing units, the projector 20 may use all the groups of pixels in either of the vertical or horizontal line together with part of the group of pixels in the other line, as image processing units. More particularly, the projector may use groups of pixels in the lower half of the projected and sensed region, groups of pixels in the lower quarter of the projected and sensed region or the like. This is because if the horizontal distortion in the projected image 12 is to be determined, the projector 20 can determine it by only using the luminance values of the pixels in the lower half of the vertical line, rather than those of all the pixels in the vertical line.

The present invention is effective for any of various other image processing systems such as CRT (Cathode Ray Tube) or LED (Light Emitting Diode) in addition to the projector 20.

The projector 20 may be any of various other projectors such as liquid crystal projectors, a projector using DMD (Digital Micromirror Device) and so on. By the way, DMD is a trademark possessed by the U.S. Texas Instruments.

In addition, the function of the projector 20 may be implemented solely by the projector 20 or by a plurality of decentralized processing sections (e.g., one projector and one PC).

What is claimed is:

1. A projector comprising:
   correction section which corrects image signals to adjust a distortion of an image;
   image projection section which projects an image based on the image signals;
   sensing section which senses the projected image to generate sensing information;
   brightness-index-value-distribution analyzing section which generates coordinate information which indicates a peak position based on the sensing information, the peak position is the brightest position in the projected image; and
   correction-amount derivation section which determines the distortion in the projected image based on the coordinate information, and deriving an amount of correction for a correction section according to a state of the distortion in the projected image,
   wherein the correction section corrects the image signals based on the amount of correction.

2. The projector as claimed in claim 1,
   wherein the brightness-index-value-distribution analyzing section partitions the sensed projected image by predetermined image processing units based on the sensing information, detecting a portion of the sensed projected image that includes a image processing units having a maximum brightness index value among all of the image processing units as the peak position or detecting part of a portion of the sensed projected image in which the image processing units adjacent to one another have the same brightness index value as the peak position.

3. The projector as claimed in claim 2,
   wherein the image processing units include vertical pixels and horizontal pixels, the vertical pixels being pixels arranged in a vertical direction in the sensed projected image and the horizontal pixels being pixels arranged in a horizontal direction in the sensed projected image, and
   wherein the brightness-index-value-distribution analyzing means computes an accumulated brightness index value for each of groups of the vertical pixels and compares the accumulated brightness index value in each of the groups of the vertical pixels adjacent to one another in the horizontal direction, determines a horizontal coordinate position of the peak position based on a pixel position of a portion of the sensed projected image in which the groups of the vertical pixels adjacent one another in the horizontal direction have the same accumulated brightness index value, computes an accumulated brightness index value for each of groups of the horizontal pixels and compares the accumulated brightness index value in each of the groups of the horizontal pixels adjacent to one another in the vertical direction, and determines a vertical coordinate position of the peak position based on a pixel position of a portion of the sensed projected image in which the groups of the horizontal pixels adjacent one another in the vertical direction have the same accumulated brightness index value.

4. The projector as claimed in claim 3,
   wherein the brightness index value is a luminance value, and
   wherein the brightness-index-value-distribution analyzing means determines the horizontal coordinate position of the peak position based on a pixel position at which a rate of change in a total luminance value in each of the groups of the vertical pixels adjacent to one another in the horizontal direction is equal to one, and determines the vertical coordinate position of the peak position based on a pixel position at which a rate of change in a total luminance value in each of the groups of the horizontal pixels adjacent to one another in the vertical direction is equal to one.

5. The projector as claimed in claim 1,
wherein the image projection means projects a black-colored image and a white-colored image,
wherein the sensing means generates the sensing information for the black-colored image and the sensing information for the white-colored image, and
wherein the brightness-index-value-distribution analyzing means generates the sensing information from which influence of ambient light is eliminated based on a difference between the sensing information of the black-colored image and the sensing information of the white-colored image, and detects the peak position based on the generated sensing information.

6. A program contained on a computer readable medium for use with a computer, the program comprising:
a program for correcting image signals to adjust a distortion of an image;
a program for projecting an image based on the image signals;
a program for sensing the projected image to generate sensing information;
a program for generating coordinate information which indicates a peak position based on the sensing information, the peak position is the brightest position in the projected image; and
a program for determining the distortion in the projected image based on the coordinate information, and deriving an amount of correction for a correction section according to a state of the distortion in the projected image,
wherein the correction section corrects the image signals based on the amount of correction.

7. An image processing method, comprising:
correcting image signals to adjust a distortion of an image;
projecting an image based on the image signals;
sensing the projected image to generate sensing information;
generating coordinate information which indicates a peak position based on the sensing information, the peak position is the brightest position in the projected image; and
determining the distortion in the projected image based on the coordinate information, and deriving an amount of correction for a correction section according to a state of the distortion in the projected image,
wherein the correction section corrects the image signals based on the amount of correction.

8. The image processing method as claimed in claim 7, further comprising:
partitioning the sensed projected image by predetermined image processing units based on the sensing information, detecting a portion of the sensed projected image that includes a image processing units having a maximum brightness index value among all of the image processing units as the peak position or detecting part of a portion of the sensed projected image in which the image processing units adjacent to the another have the same brightness index value as the peak position.

9. The image processing method as claimed in claim 7,
wherein the image processing units include vertical pixels and horizontal pixels, the vertical pixels being pixels arranged in a vertical direction in the sensed projected image and the horizontal pixels being pixels arranged in a horizontal direction in the sensed projected image, and
wherein generating coordinate information includes computing an accumulated brightness index value for each of groups of the vertical pixels and compares the accumulated brightness index value in each of the groups of the vertical pixels adjacent to one another in the horizontal direction, determines a horizontal coordinate position of the peak position based on a pixel position of a portion of the sensed projected image in which the groups of the vertical pixels adjacent one another in the horizontal direction have the same accumulated brightness index value, computes an accumulated brightness index value for each of groups of the horizontal pixels and compares the accumulated brightness index value in each of the groups of the horizontal pixels adjacent to one another in the vertical direction, and determines a vertical coordinate position of the peak position based on a pixel position of a portion of the sensed projected image in which the groups of the horizontal pixels adjacent one another in the vertical direction have the same accumulated brightness index value.

10. The image processing method as claimed in claim 9,
wherein the brightness index value is a luminance value, and
wherein generating coordinate information includes determining the horizontal coordinate position of the peak position based on a pixel position at which a rate of change in a total luminance value in each of the groups of the vertical pixels adjacent to one another in the horizontal direction is equal to one, and determines the vertical coordinate position of the peak position based on a pixel position at which a rate of change in a total luminance value in each of the groups of the horizontal pixels adjacent to one another in the vertical direction is equal to one.

11. The image processing method as claimed in claim 7,
wherein projecting an image includes projecting a black-colored image and a white-colored image,
wherein sensing includes generating the sensing information for the black-colored image and the sensing information for the white-colored image, and
wherein generating the coordinate information includes generating the sensing information from which influence of ambient light is eliminated based on a difference between the sensing information of the black-colored image and the sensing information of the white-colored image, and detects the peak position based on the generated sensing information.

* * * * *